United States Patent [19]
Lepine

[11] Patent Number: 5,871,849
[45] Date of Patent: Feb. 16, 1999

[54] WOOD SUBSTITUTE TURNING BLANK AND METHOD OF MAKING THE SAME

[76] Inventor: Guy Joseph Lepine, 1748 - 39 Street N.W., Edmonton, Alberta, Canada, T6L 2R5

[21] Appl. No.: 839,134

[22] Filed: Apr. 23, 1997

[51] Int. Cl.⁶ ...................................................... B32B 9/00

[52] U.S. Cl. ...................... 428/542.8; 428/63; 428/66.6; 428/72; 428/131; 428/165; 428/182; 428/192; 428/218; 428/323; 428/537.1; 144/43; 144/46; 142/7; 52/730.2; 52/730.4; 52/730.7

[58] Field of Search ............................... 428/182, 72, 76, 428/184, 218, 192, 537.1, 131, 165, 63, 66.6, 323, 542.8; 52/730.4, 730.7, 730.2; 144/46, 43; 142/7

[56] References Cited

U.S. PATENT DOCUMENTS

| | | | |
|---|---|---|---|
| 4,181,165 | 1/1980 | Ramsay | 144/325 |
| 5,645,117 | 7/1997 | Wirth, Jr. et al. | 144/28 |
| 5,681,641 | 10/1997 | Grigsby et al. | 428/182 |

*Primary Examiner*—William Krynski
*Assistant Examiner*—Abraham Bahta
*Attorney, Agent, or Firm*—Anthony R Lambert

[57] ABSTRACT

A wood substitute turning blank and method of making the same is described. The turning blank includes a body having an outer shell of relatively low tensile strength material positioned about a rotational axis of the body. An inner core of relatively high tensile strength material is positioned along the rotational axis of the body. The high tensile strength of the inner core allows this turning blank to be turned at high speed on a lathe or the like. The high tensile strength of the core enhances the overall tensile strength of the finished product.

3 Claims, 3 Drawing Sheets

WOOD SUBSTITUTE TURNING BLANK AND METHOD OF MAKING THE SAME

FIELD OF THE INVENTION

The present invention relates to a wood substitute turning blank and a method of making the same.

BACKGROUND OF THE INVENTION

In order to use a lathe, or similar equipment which rotate a workpiece, one must start with a turning blank. The turning blank is clamped securely between chucks on the lathe. The lathe is then used to rotate the turning blank at high speed while a cutting tool is brought in contact with the turning blank. Contact with the cutting tool sculpts the turning blank into a desired symmetrical form. Spindles for railings and legs for tables and chairs are commonly made in this manner.

As wood becomes increasingly scarce, industry is shifting to the use of alternative materials in an attempt to secure the highest quality of work product at the lowest possible cost. One common wood substitute is medium density fibreboard. Medium density fibreboard is a made of fibre that is held together with a resin binder. These materials have replaced wood in such applications as moldings, as they have desirable finishing properties. They have not, however, proven suitable for use as turning blanks as they have extremely limited tensile strength. The probability of tensile failure makes them unsuitable for use in turning. When such tensile failure occurs during high speed rotation, portions of the failed turning blank become projectiles that present a hazard to the health and safety of all persons in the vicinity.

SUMMARY OF THE INVENTION

What is required is a turning blank that will be a suitable substitute for wood, and a method of making the same.

According to one aspect of the present invention there is provided a wood substitute turning blank including a body having an outer shell of relatively low tensile strength material positioned about a rotational axis of the body. An inner core of relatively high tensile strength material is positioned along the rotational axis of the body.

With the turning blank, as described above, the inner core determines the tensile strength of the turning blank. A material for use as the inner core can, therefore, be selected that has the requisite strength for turning and to suit the strength requirements of the intended application. A material for use as the outer shell can be selected that has the desired finishing properties. By way of example, an inner core of wood can be used with an outer shell of medium density fibreboard.

According to another aspect of the present invention, there is provided a method of fabricating a wood substitute turning blank. The first step involves providing a first body of relatively low tensile strength material having a rotational axis. The second step involves providing a second body of relatively high tensile strength material which has a smaller cross-sectional dimension than the first body. The third step involves hollowing out a space to accommodate the cross-sectional dimension of the second body along the rotational axis of the first body. The fourth step involves securing the second body in the hollowed out space along the rotational axis of the first body. For ease of manufacture it is preferred that the first body be segmented about the rotational axis into at least two segments, and securing the segments with adhesive around with second body.

With a turning blank, as described above, the final product receives its tensile strength from the strength of the core. A turning blank with a wood core, therefore, has a tensile strength roughly equivalent to wood. This enables the turning blank to be used for railing spindles, chair legs, table legs, and other applications in which medium density fibreboard alone is clearly inadequate.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
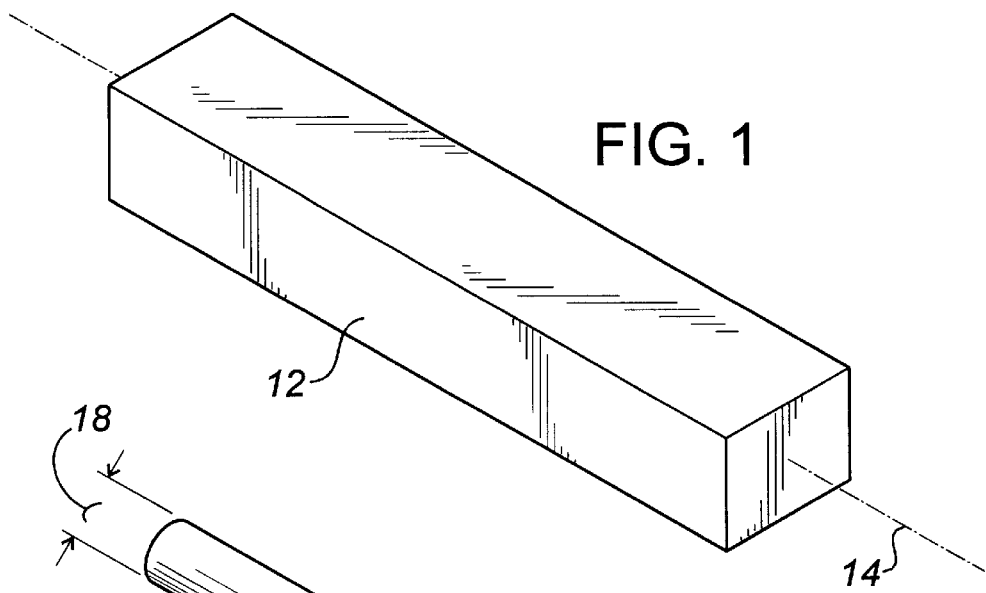
FIG. 1 is a perspective view of a first body used in the fabrication of a turning blank in accordance with the teaching of the present method.

The preferred embodiment, a turning blank generally identified by reference numeral 10, will now be described with reference to FIGS. 1 through 6.

Figure 2:
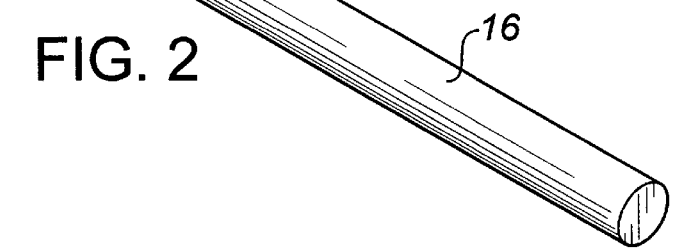
FIG. 2 is a perspective view of a second body used in the fabrication of a turning blank in accordance with the teaching of the present method.
Figure 3:
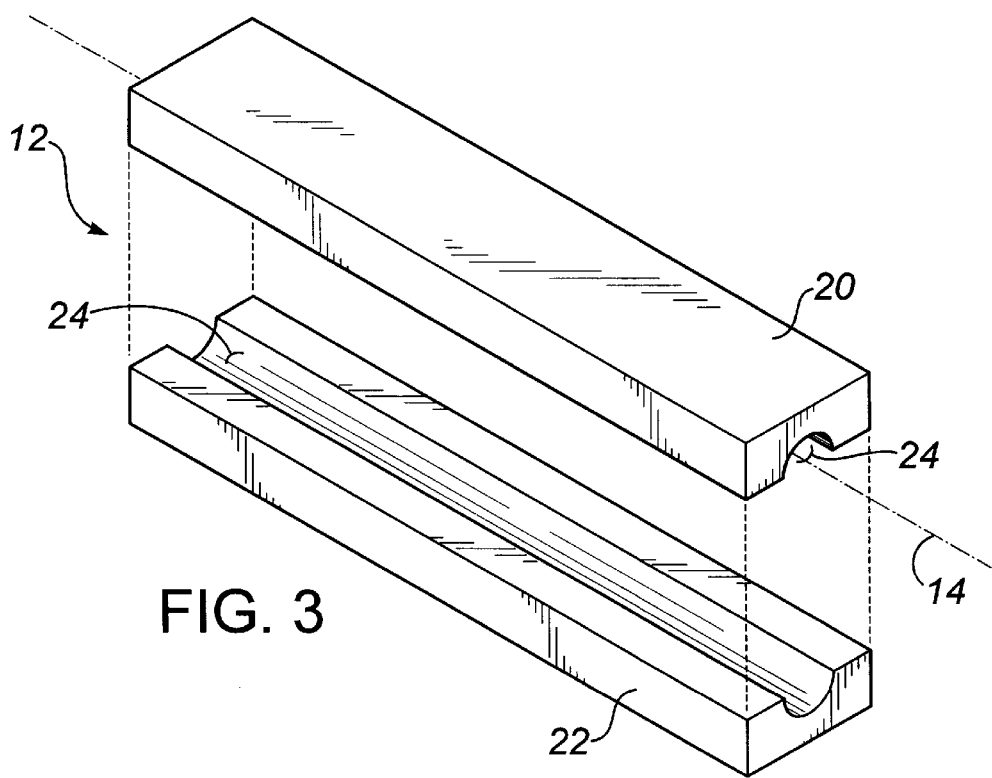
FIG. 3 is a perspective view of showing the segmenting and hollowing out of the first body illustrated in FIG. 1.
Figure 4:
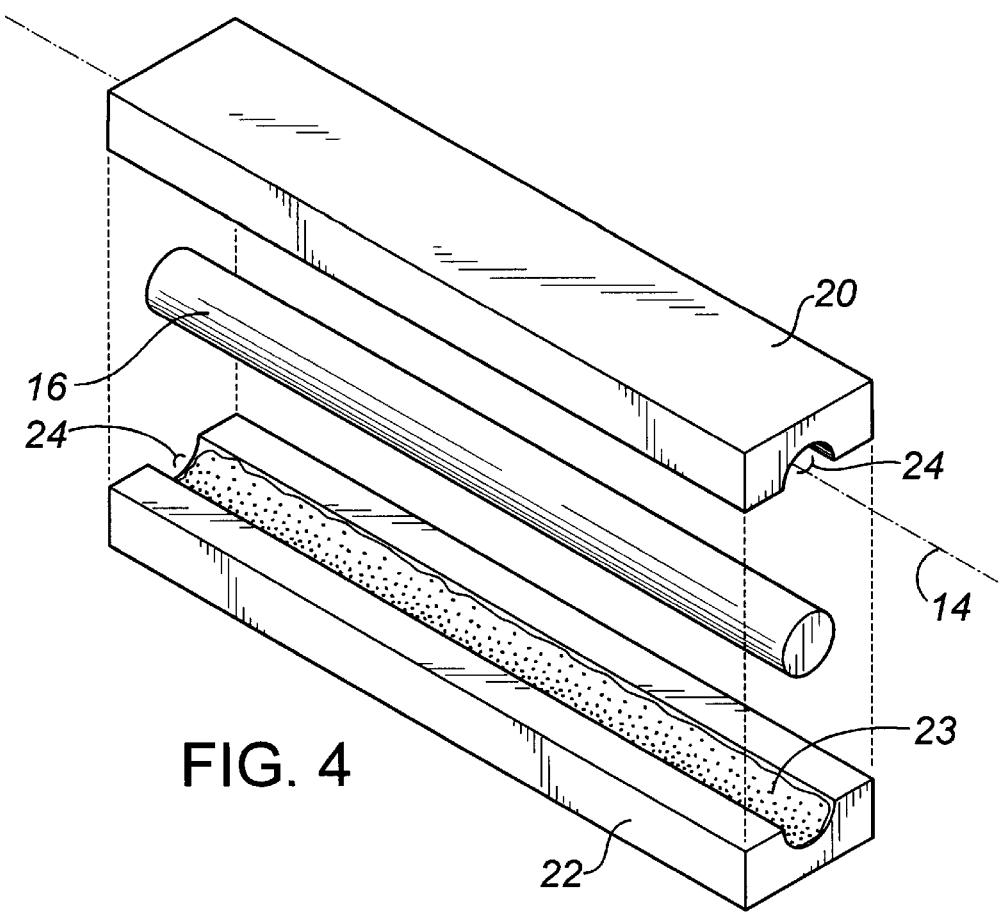
FIG. 4 is a perspective view of the assembly of the first body and the second body to form a turning blank.

The preferred method of fabricating turning blank 10 will first be described. Referring to FIG. 1, the first step involves providing a first body 12 of relatively low tensile strength material having a rotational axis 14. Referring to FIG. 2, the second step involves providing a second body 16 of relatively high tensile strength which has a smaller cross-sectional dimension, indicated at 18 than first body 12. Referring to FIG. 3, the third step involves segmenting and hollowing out first body 12. First body 12 is segmented about rotational axis 14 into two segments 20 and 22. A space 24 is then hollowed out of segments 22 and 24 to accommodate cross-sectional dimension 18 of second body 16 along rotational axis 14 of first body 12. Referring to FIG. 4, the fourth step involves securing segments 20 and 22 by means of adhesive 23 around second body 16, such that second body 16 is positioned in hollowed out space 24 along rotational axis 14 of first body 12.

Figure 5:
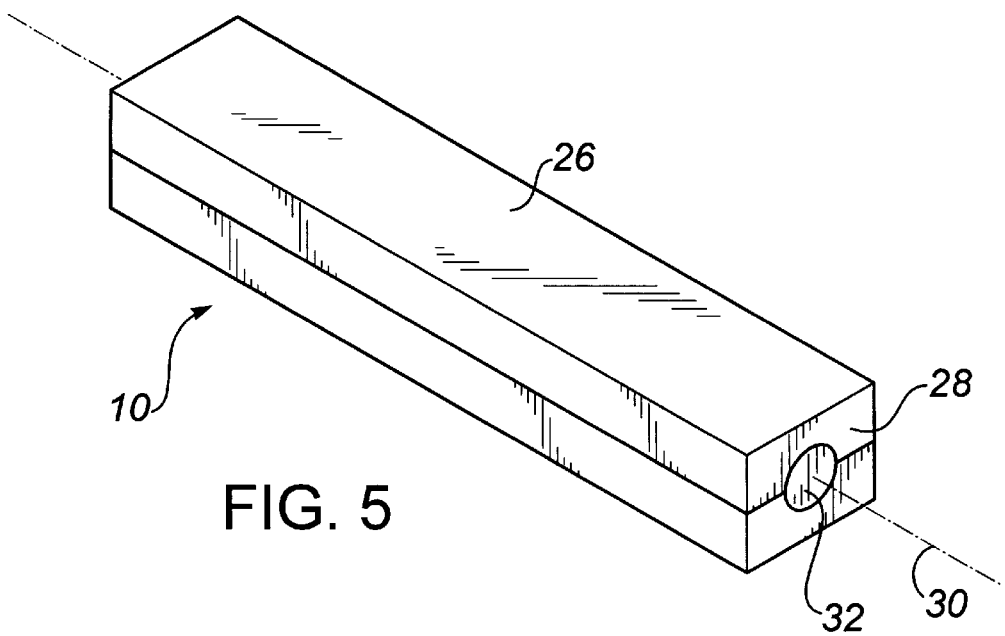
FIG. 5 is a perspective view of a turning blank fabricated in accordance with the teaching of the present method.

Referring to FIG. 5, turning blank 10 which results from the teachings of this method includes a body 26 having an outer shell 28 of relatively low tensile strength material positioned about a rotational axis 30 of body 26. An inner core 32 of relatively high tensile strength material is positioned along rotational axis 30 of body 26.

Figure 6:
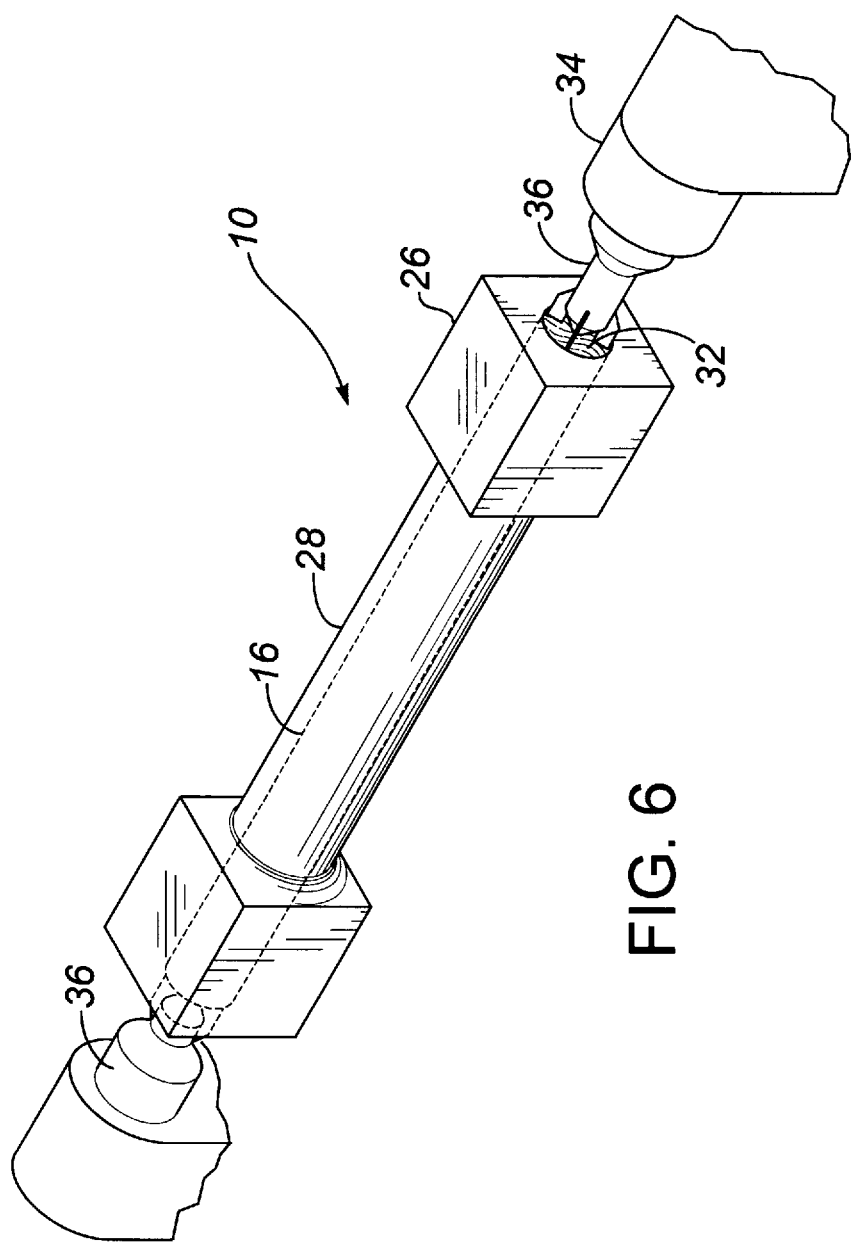
FIG. 6 is a perspective view of the turning blank illustrated in FIG. 1 in the process of being turned into a spindle on a lathe.

Referring to FIG. 6, the manner in which turning blank 10 is well suited to be turned upon a lathe 34 is illustrated. Chucks 36 of lathe 34 engage high tensile strength inner core 32, enabling body 26 to be safely turned while a cutting tool (not shown) cuts away a portion of outer shell 28 to create a symmetrical pattern. The material used as inner core 32 is selected to suit the strength requirements of the intended application. The material used as outer shell 28 is selected for its finishing properties. By way of example, an inner core of wood can be used with an outer shell of medium density fibreboard.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A wood substitute turning blank, comprising:

a body having an outer shell of fibreboard positioned about a rotational axis of the body with a bonded inner core of material having a higher tensile strength than fiberboard positioned along the rotational axis of the body.

2. The wood substitute turning blank as defined in claim 1, wherein the inner core is wood.

3. A wood substitute turning blank as defined in claim 1, wherein the outer shell includes at least two bonded segments.

* * * * *